UNITED STATES PATENT OFFICE.

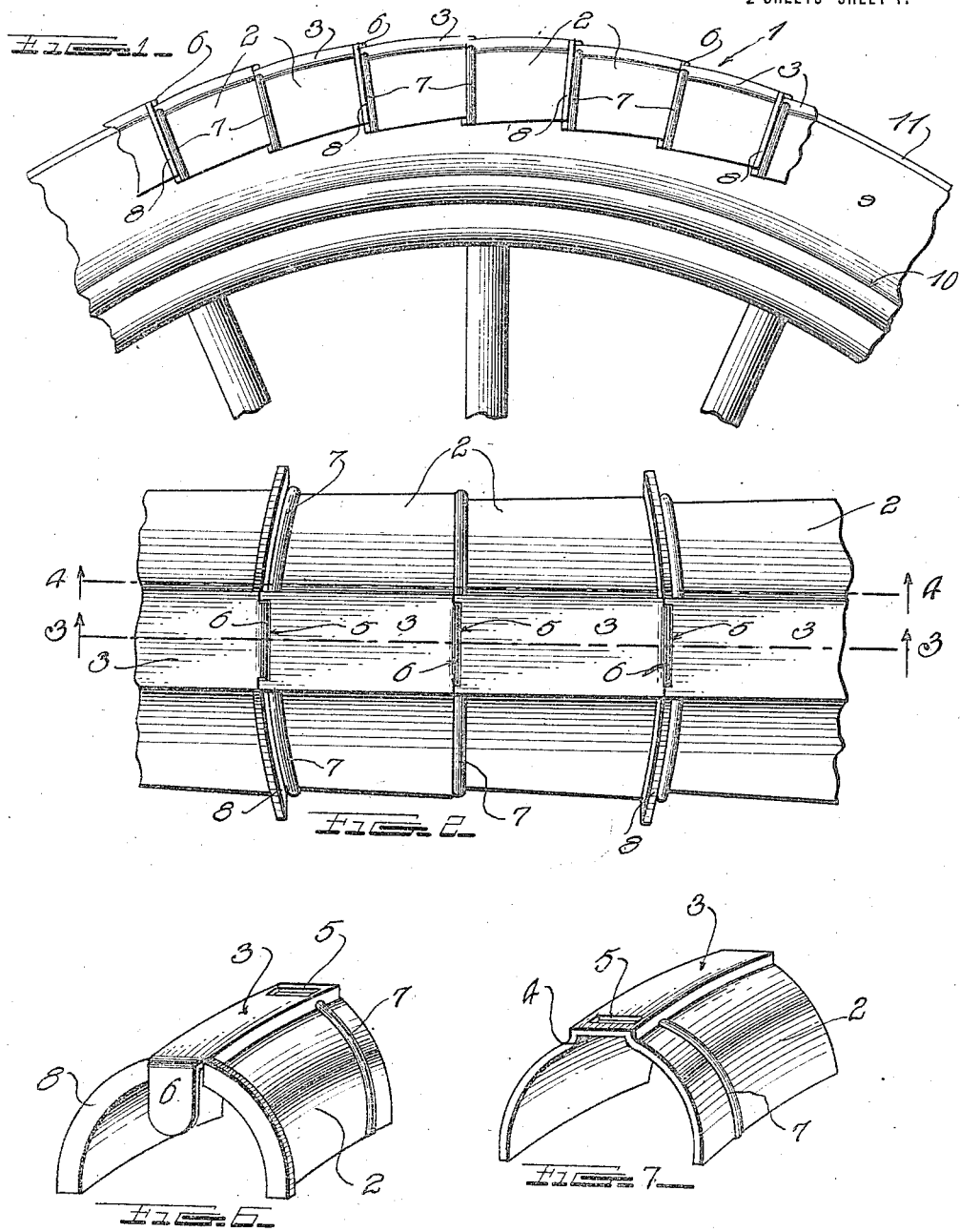

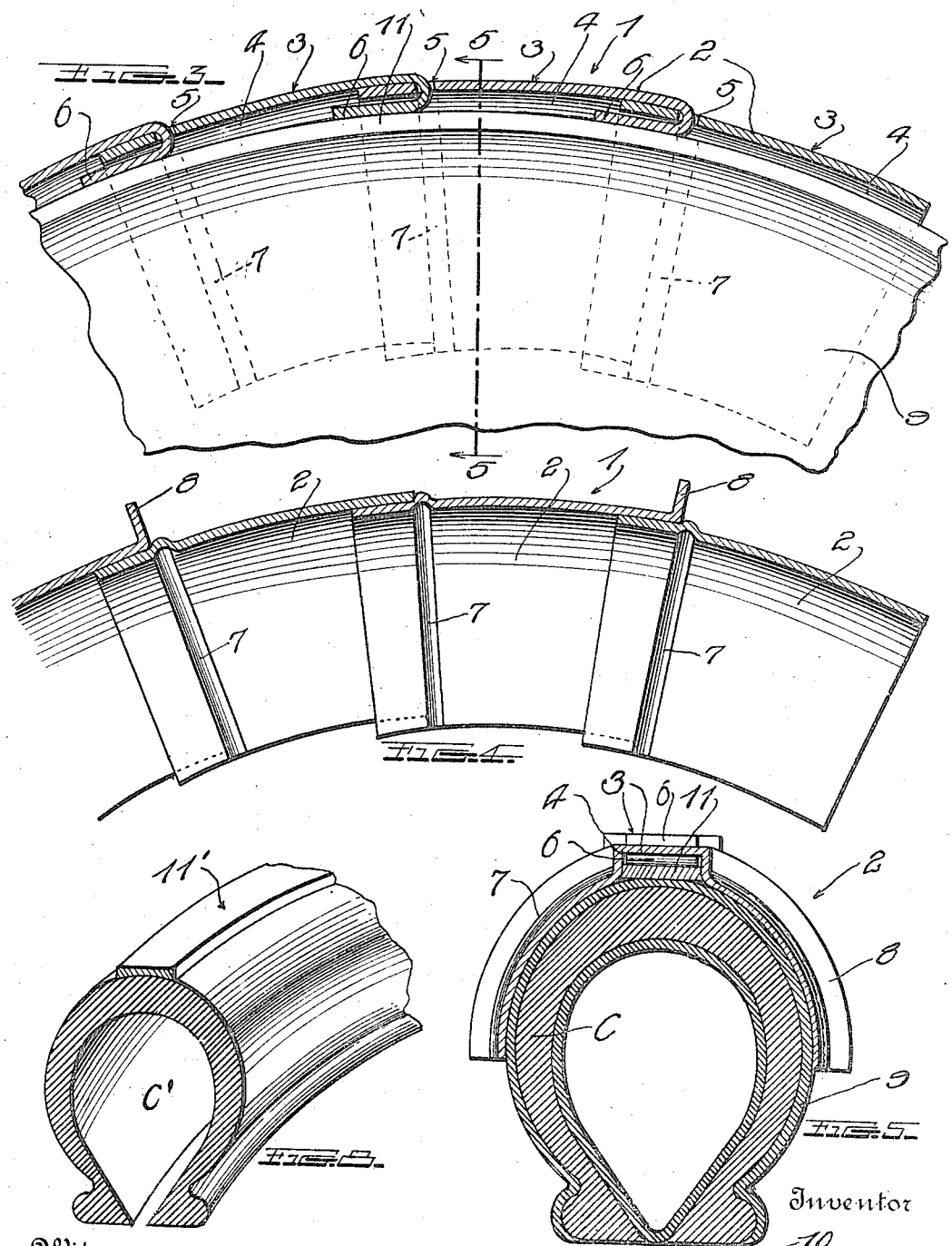

WILLIAM McNAMES, OF ABERDEEN, SOUTH DAKOTA.

TIRE-ARMOR.

1,232,821.   Specification of Letters Patent.   Patented July 10, 1917.

Application filed April 24, 1916. Serial No. 93,240.

*To all whom it may concern:*

Be it known that I, WILLIAM McNAMES, a citizen of the United States, residing at Aberdeen, in the county of Brown and State of South Dakota, have invented certain new and useful Improvements in Tire-Armors; and I do declare the following to be a full, clear, and exact description of the invention, such as will enable others skilled in the art to which it appertains to make and use the same.

My invention which is an improved tire armor has for its object to provide a device of this class which may be inexpensively manufactured and marketed, yet which regardless of these characteristics will be highly efficient and durable, serving not only as puncture proofing means but to prevent skidding.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of a portion of an automobile wheel showing the application of the invention to the tire casing thereof;

Fig. 2 is a plan view of a portion of the armor;

Figs. 3 and 4 are enlarged longitudinal sectional views taken on the planes indicated respectively by the lines 3—3 and 4—4 of Fig. 2;

Fig. 5 is a transverse section taken on the plane indicated by the line 5—5 of Fig. 3;

Figs. 6 and 7 are perspective views of two sections of the armor; and

Fig. 8 is a sectional perspective view of one form of casing which may be used in connection with the armor.

In specifically describing the construction shown in the drawings above briefly described, similar characters will be placed on corresponding parts throughout the several views and reference will be herein made to the numerous elements by their respective indices. To this end, the numeral 1 designates the improved armor which is constructed of a number of sections 2 flexibly secured together. Each section 2 is stamped from a single rectangular sheet metal plate preferably about one-eighth of an inch in thickness, the latter being arched as shown for close contact with the exterior of a tire casing.

The tread portions of the plates which form the numerous sections 2 are stamped outwardly to simultaneously provide external ribs 3 and internal channels 4 extending throughout the width of said plates. One end of each rib 3 is formed with a transverse slot 5 which opens into the channel 4, while the other end of each rib has formed integrally therewith a hook 6 which extends into the aforesaid channel as shown clearly in Fig. 3. These hooks and slots serve to flexibly connect the numerous sections 2 when applied.

In constructing the armor 1, the numerous sections 2 are overlapped as shown with the hooks and slots interengaging and with one end of the rib of each section received in the adjacent end of the channel of the adjacent section, thus forming a very effective article which will be absolutely puncture proof. For the purpose of preventing dirt or other injurious matter from entering the space between the casing and the armor where the numerous sections of the latter overlap, the underlying edges of said sections are formed with external transverse ribs 7 which abut the overlying edges of adjacent sections as shown most clearly in Fig. 4.

The alined ribs 3 will serve to a large extent to prevent skidding, but in addition to this means, alternate sections 2 will have their overlying transverse edges bent outwardly to provide anti-slipping flanges 8 shown most clearly in Fig. 6.

For the purpose of preventing lateral shifting of the armor 1 upon the tire casing C, the latter may be provided with a supplemental casing 9 whose edges will engage the rim of the wheel as indicated at 10, said supplemental casing being constructed of rubber or other suitable material and having on its tread a ridge 11 which will in most cases be constructed of leather on account of the wear resisting qualities of the latter. This ridge is received in the alined channels 4 as shown most clearly in Fig. 5 and serves not only to prevent lateral shifting of the armor but to protect the casing C from the hooks 6.

In Fig. 8 a casing C' is shown having a ridge 11' secured thereto in any preferred manner but preferably cemented, said ridge being constructed of leather or other suitable wear resisting material and having the same function as the ridge 11 above described.

In order to apply the improved armor it is necessary to deflate the tire and when the latter is again inflated the armor will be held frictionally upon the casing and will operate to great advantage for preventing punctures, blow-outs and skidding.

From the foregoing, taken in connection with the accompanying drawings, the construction, manner of operation and advantages of the invention will be readily understood without requiring a more extended explanation, but in conclusion I will state that although certain specific details have been shown and described for accomplishing probably the best results, numerous changes may be made within the scope of the invention as claimed without sacrificing the main advantages thereof.

I claim:

1. In combination, a tire casing having a circumferentially extending wear resisting ridge on its tread and an armor for said casing, said armor consisting of a number of arched plates extending transversely of the tire and each having an external circumferentially extending rib at its tread and an internal circumferential channel within said rib, one end of the rib of each plate having a transverse slot which opens into the channel of said plate while the other end of the rib is provided with a hook positioned in said channel, the several plates being overlapped at their edges with the ends of the ribs and channels interengaging and with the hooks received in the slots, the channels receiving therein the aforesaid ridge of the casing whereby the armor is held against lateral shifting on said casing and whereby the latter is protected against the hooks.

2. In combination, a tire casing having a circumferentially extending wear resisting ridge on its tread and an armor for said casing, said armor consisting of a plurality of arched sheet metal plates extending transversely of the casing, each plate having its tread portion stamped outwardly to simultaneously provide an external rib and an internal channel both extending circumferentially, one end of the rib of each plate having a transverse slot opening into the channel while the other end of said rib has formed integrally therewith a hook bent inwardly into said channel, the numerous plates being overlapped with the ribs and channels interengaged and with the hooks received in the slots, the aforesaid ridge of the casing being received in said channels whereby to prevent lateral shifting of the former and to protect said casing against injury by the hooks.

3. A tire armor consisting of a number of arched plates to extend transversely of the tire, each plate having an external circumferentially extending rib on its tread and an internal circumferential channel within said rib, one end of the rib of each plate having a transverse slot which opens into the channel of said plate while the other end of the rib is provided with a hook positioned in said channel, the several plates being overlapped at their ends with the ends of the ribs and channels interengaging and with the hooks received in the slots and confined in the channels.

4. A tire armor consisting of a plurality of arched sheet metal plates to extend transversely of the tire, each plate having its tread portion stamped outwardly to simultaneously provide an external rib and an internal channel both extending circumferentially, one end of the rib of each plate having a transverse slot opening into the channel while the other end of said rib has formed integrally therewith a hook bent inwardly into said channel, the numerous plates being overlapped with the ribs and channels interengaged and with the hooks received in the slots and confined in the channels.

In testimony whereof I have hereunto set my hand in presence of two subscribing witnesses.

WILLIAM McNAMES.

Witnesses:
A. W. CAMPBELL,
F. E. MOORE.

Copies of this patent may be obtained for five cents each, by addressing the "Commissioner of Patents, Washington, D. C."